Figure 1:
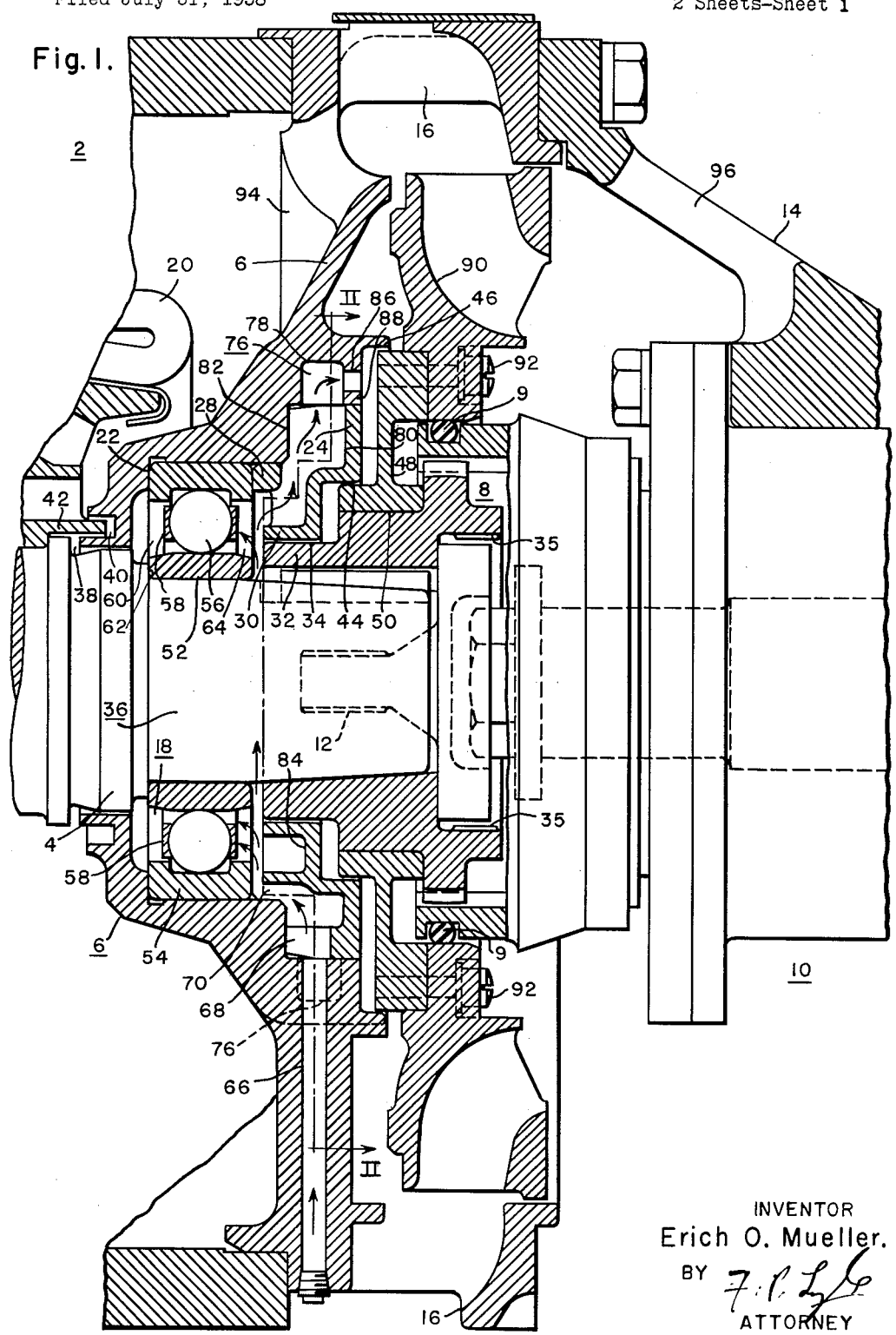

Aug. 7, 1962 E. O. MUELLER 3,048,724
BEARING ASSEMBLY FOR DYNAMOELECTRIC MACHINES
Filed July 31, 1958 2 Sheets-Sheet 1

INVENTOR
Erich O. Mueller.
BY
ATTORNEY

Aug. 7, 1962   E. O. MUELLER   3,048,724
BEARING ASSEMBLY FOR DYNAMOELECTRIC MACHINES
Filed July 31, 1958   2 Sheets-Sheet 2

United States Patent Office 3,048,724
Patented Aug. 7, 1962

3,048,724
BEARING ASSEMBLY FOR DYNAMOELECTRIC MACHINES
Erich Otto Mueller, Irwin, Pa., assignor to Westinghouse Electric Corporation, East Pittsburgh, Pa., a corporation of Pennsylvania
Filed July 31, 1958, Ser. No. 752,341
7 Claims. (Cl. 310—90)

The present invention relates to a bearing assembly, and more particularly relates to a bearing assembly for a dynamoelectric machine.

The requirement of placing dynamoelectric machines within smaller and smaller spaces is quite a prevalent one and this problem is perhaps most critical in the transportation or traction field. In order to fit a traction motor within a restricted longitudinal space, a single-bearing type of machine has been used with the single bearing on the commutator end and a direct connected misalignment type disc coupling on the drive end of the machine. Such an arrangement has not proven satisfactory however since the high horsepower and speed performance usually required of traction motors create difficult balancing problems. Single-bearing machines give rise to other problems as well, such as the impracticability of testing the traction motor separately before being connected to its load and the undesirable divided responsibility in determining misalignment or unbalance after the load to be driven is connected to the traction motor.

It is obvious that a two-bearing machine capable of fitting into the same restricted longitudinal space required of a single-bearing machine would overcome the testing and balancing problems encountered by traction equipment having a single-bearing motor.

To use a two bearing machine in place of a single bearing machine within the same overall space restrictions requires that the space needed for the bearing be of minimum axial length. It is also necessary, however, that the bearing assembly provide adequate lubrication of the bearing to be capable of proper performance for long periods of time. It is also essential to provide for bearing relubrication during this time to enable the traction motor to be adequately lubricated during the long operating periods.

In order to have effective relubrication of the bearing between major maintenance overhauls, the added lubricant must reach the bearing directly and refill the space between the anti-friction elements and their retainers. As much old lubricant as possible must be forced out of the bearing and provisions must be available for automatically relieving any overgreasing of the motor. It is well known that overgreasing of any bearing by adding more than the required amount of new lubricant can result in churning and increase the pressure and temperature within the bearing housing so as to force surplus lubricant out of the bearing housing where it may get into the windings or along the drive shaft, either of which is highly undesirable.

Various bearing constructions are known to minimize this danger. A typical construction uses a sealed grease overflow chamber between the bearing seals and the inside of the machine. A grease drain connects the lubricant overflow chamber through the bearing housing to the outside of the machine. The main disadvantage of this and similar types of construction is the need for extra space in the axial direction, which dimension is, along with all others, highly restricted in the traction equipment field.

Provision for low pressure lubricant relief means capable of purging the bearing automatically of excess grease within the bearing is desirable in any bearing construction.

The principal object of my invention is to provide a bearing assembly which requires minimum axial space and yet provides adequate lubrication.

Another object of my invention is to provide a dynamoelectric machine which can be provided with two bearings yet requiring no more longitudinal space for mounting than a single-bearing machine of similar rating.

Another object of my invention is to provide a dynamoelectric machine having a bearing construction capable of directing the flow of fresh lubricant directly to the bearing.

Another object of my invention is to provide a dynamoelectric machine having a bearing construction with an excess overflow grease sump requiring no extra space in the axial direction.

Figure 2:
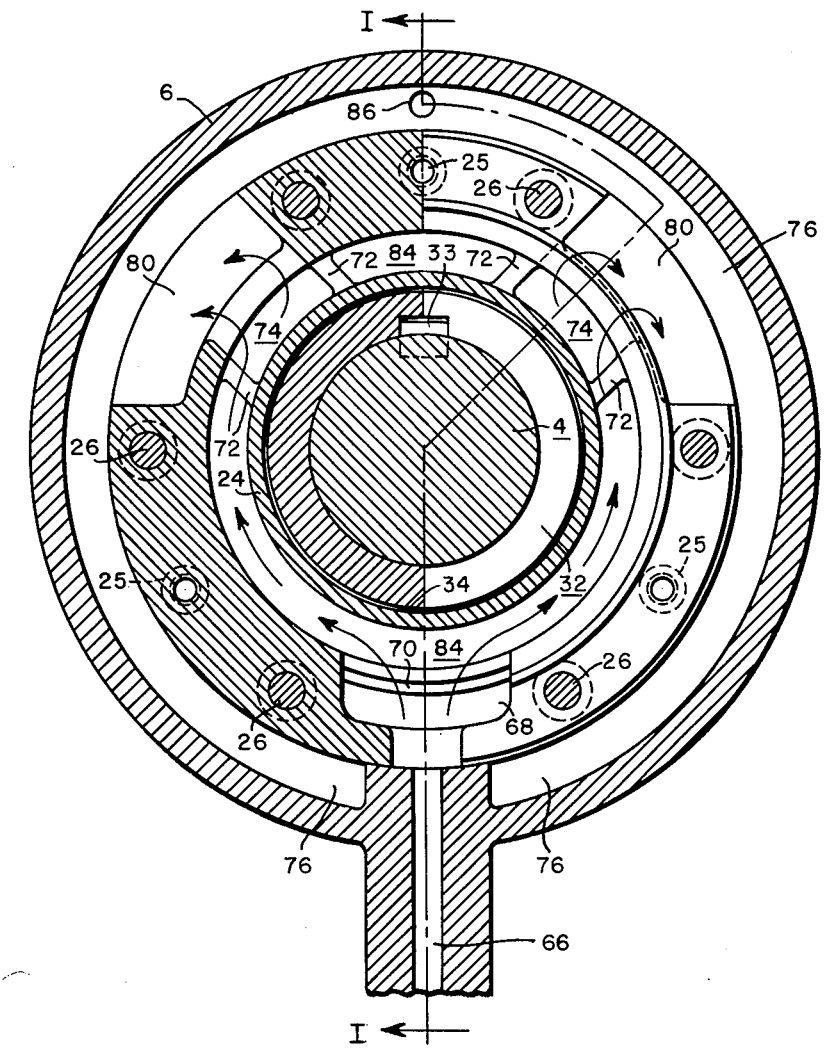

Further objects and advantages of my invention will be more fully understood from the following detailed description, taken in connection with the accompanying drawing, in which:

FIGURE 1 is a fragmentary side elevation view, partly in section, taken along the line I—I of FIG. 2, of a dynamoelectric machine embodying my invention coupled to a typical connected load; and FIG. 2 is a fragmentary end elevation view, partly in section, taken generally along the line II—II in FIG. 1.

While my invention may be embodied in any type of dynamoelectric machine, I have chosen to illustrate my invention in a traction type motor 2 (partially shown) with its drive shaft 4 extending through an end bracket 6 and connected by means of an external-internal tooth double-mesh coupling 8 to a gear drive unit 10. A stub shaft 12 from the load 10 is inserted into a recess in the drive shaft 4 of the traction motor 2 and aligned thereto by the double-mesh coupling 8. The coupling 8 is filled with lubricant and sealed by O-rings 9. The connected load or gear drive unit 10 is bolted directly to the traction motor 2 by means of end pieces 14 secured to the motor frame 17 by through bolts which pass through axial bridging portions 16 of the end bracket 6.

As can be seen from FIG. 1, a bearing member 18 rotatably supporting the drive shaft 4 is located as close as possible to the armature core 20 of the motor 2. The bearing member 18 is positioned by means of a bearing seat 22 in the end bracket 6. A bearing cap 24 is secured to the end bracket 6 by means of bolts 26 although any suitable securing means may be used. A substantially circular ridge 28 on the bearing cap 24 urges the bearing 18 into position on the seat 22. The bearing cap 24 has an annular flange 30 coaxial with the drive shaft 4. A motor half coupling member 32 is pressed or shrunk upon the drive shaft 4 so as to form a close running fit, indicated at 34, with the annular flange 30 of the bearing cap 24. The half coupling member 32 is secured against slipping on the shaft 4 by means of a key 33 and has pull-off threads 35 for removal of the coupling from the shaft when desired. Threaded openings 25 within the bearing cap 24 allow insertion of jack screws for pulling the bearing cap 24 when further disassembly is desired.

It can be seeen that a bearing housing 36 is formed by the end bracket 6, the motor coupling member 32 and the bearing cap 24.

The bearing housing 36 is effectively sealed for containing lubricant. A double-labyrinth type seal 38 having very close running clearances is formed by a circular groove 40 in the end bracket 6 and a circular ledge 42 on the drive shaft 4 and effectively seals lubricant within the housing 36 from the inboard portion of the shaft 4 and the armature winding 20. A series of stepped seals prevent lubricant leakage along the outboard portion of the shaft 4. The stepped seals are close running fits, as indicated at 34, and as formed at 44 and 46 between a coupling adapter 48 and the bearing cap 24 and end bracket 6. The coupling adapter 48 is shrunk onto the motor coupling member 32 as indicated at 50.

The close running stepped seals 34, 44 and 46 are filled with a suitable very heavy-bodied sealing grease of high melting point and having no tendency to separate when subjected to friction. The heavy-bodied grease contains no material which might be abrasive to the rotating parts. The stepped seals, filled with such heavy sealing grease, prevent leakage along the outboard portion of the shaft 4 of the lighter lubricants used inside the bearing housing 36.

It is to be noted that no extra axial space is required for the bearing housing 36 since the housing 36 for the most part extends over the motor coupling 32 and may be positioned as shown to extend in under the armature winding 20. The stepped seals 34, 44 and 46 are also located within the axial space of the motor coupling 32 but on a slightly larger diameter.

The bearing member 18 may be any suitable type of anti-friction bearing and is shown as consisting of an inner race 52 press-fitted upon the drive shaft 4 and an outer race 54 which is held stationary in the end bracket 6. Anti-friction elements 56 located between the inner race 52 and outer race 54 are contained in a retainer or cage 58. The bearing member 18 has an open face on each side of the bearing member. The inner face 60 of the bearing member 18 is spaced away from the inner surface of the end bracket 6 by means of the seat 22 and a shoulder 62 on the drive shaft 4. The outer face 64 is spaced away from the bearing housing 36 by the circular rim 28 on the bearing cap 24.

To furnish satisfactory performance, the bearing must have provisions for adequate lubrication over long operating periods. The bearing housing 36 must provide the bearing 18 with an adequate lubricant reservoir and means for purging old lubricant when new lubricant is added. As much of the old lubricant as possible must be forced out of the bearing 18. Overlubrication or overgreasing must automatically relieve itself to avoid possible harm to the armature winding 20 or to the bearing itself.

In accordance with the present invention, a bearing housing is provided which is capable of directing newly added lubricant to the bearing 18, which is capable of automatically relieving the bearing 18 of excess lubricant in case of accidental overlubrication and which, as mentioned above, requires no additional axial space. An overflow sump is provided for storing old lubricant from within the bearing 18 as well as any overflow resulting from overlubrication.

My invention makes provisions for accomplishing these desirable features. A lubricant inlet bore 66 extends radially through the end bracket 6 into the bearing housing 36 and connects with a cavity 68 formed by the bearing cap 24 and the end bracket 6. This cavity 68, in turn, communicates with the outer bearing face 64 by means of an axially extending narrow slot 70 formed by the end bracket 6 and the bearing cap 24. The narrow slot 70 connects the cavity 68 and inlet bore 66 to the outer bearing face 64. The narrow axial slot 70 forces newly added lubricant to flow towards the bearing face 64 at the lower portion of the bearing 18. Since the bearing cap 24 is spaced away from the outer bearing face 64 and the motor coupling 32 is also spaced away from the bearing face 64, lubricant can flow over the entire face of the bearing member 18. Additional grease capacity within the bearing housing 36 is furnished by a substantially annular channel 84 formed within the bearing cap 24 but spaced away from the outer bearing face 64.

At the upper portion of the bearing housing 36, rib members 72 integral with the bearing cap 24, are provided. These ribs 72 extend close to the face 64 of the bearing and serve to force the lubricant, travelling along the outer open face 64, and through the channel 84, into the anti-friction elements 56 and retainer or cage 58 at the top portion of the bearing. The rib members 72 form overflow ports 74 between them which receive lubricant forced from the bearing 18 and direct it to an overflow chamber or sump 76. The overflow chamber or sump 76 is part of the bearing housing 36 and requires no additional axial space for its formation. The overflow chamber or sump 76 is formed by a substantially annular internal channel 78 within the end bracket 6. The overflow chamber or sump 76 is further enlarged by the space between the surface of a portion 80 of the bearing cap 24 and an additional portion 82 of the end bracket 6 axially displaced inward from the annular channel 78.

It is to be understood that the overflow ports 74 extending between the outer bearing face 64 and the overflow chamber or sump 76 may be located symmetrically on either side of the vertical center line of the bearing housing 36, as shown in the drawing, or a single overflow port could be located on the vertical center line or at any other position, consistent with my invention.

The bearing 18 and the bearing housing 36 are filled during manufacture with a suitable grease to provide lubrication for a considerable length of time. Should regreasing become necessary, the grease can be added through the grease inlet bore 66 which connects with the cavity 68 in the outer bearing cap 24. The narrow axial slot 70 forces the added grease to flow towards the outer open face 64 of the bearing member 18. In order to reach the lubricant overflow ports 74, the new grease is forced to flow over the entire outer face 64 of the bearing. Most of the old grease adjacent to the bearing 18 is pushed ahead of the new grease and enters the overflow ports 74. Resistance to the flow of grease by the double-labyrinth seals 38 and the stepped running seals 34, 44 and 46 is many times greater than the resistance offered by the overflow ports 74 so that the new grease will find its way through the bearing faces and refill the bearing completely without penetrating the seals. The approximate flow of new grease from the inlet slot 66 to the overflow ports 74 is indicated by the arrows in the drawing.

The old grease, replaced and pushed out by newly added grease, enters the excess grease chamber or sump 76 through the overflow ports 74. No drain to the outside is required since the chamber 76 is large enough to store excess grease from a number of regreasings. The excess grease chamber 76 allows sufficient regreasings of the bearing to allow operation of the traction equipment for extended periods of time between major maintenance overhauls. During a major maintenance overhaul, the excess grease within the excess grease chamber 76 is thoroughly cleaned out and removed.

If the bearing member 18 has been regreased by adding more than the required amount of new grease, the resulting churning and pressure increase will force the surplus grease through the overflow ports 74 into the excess grease chamber 76. A relief hole 86 located at the top of the excess grease chamber 76 and through the end bracket portion 88 forming an outer wall of the bearing housing 36 prevents pressure buildup within the bearing housing 36 by allowing the escape of air that could be entrapped within the bearing housing 36.

Another bearing, not shown, supports the drive shaft 4 at its opposite end. This bearing may be of the disclosed construction or any usual conventional construction, whichever is desired.

Since the bearing member 18 is located as closely as possible to the armature winding 20, the conventional ventilating systems of most dynamoelectric machines can not be used. If the ventilating means were conventionally located, additional axial dimensions or space would be required for its mounting. My invention utilizes further the axial space required for the coupling described. A fan blade ring 90 is secured by means of bolts 92, or any other suitable means of securing, to the outer portions of the coupling adapter 48. The fan blade ring 90 is aligned with openings 94 in the end bracket 6 of the motor housing. The fan blade ring 90 is located so as to use the same axial space as the coupling 8 and the bearing housing 36 by making use of the normally unused space surrounding the coupling diameter. The fan ring 90 draws air from the outside of the motor through the openings 96 in the bracket member 14. The air is then discharged by the fan ring 90 towards the end bracket 6, and enters the motor housing through the openings 94 provided in the end bracket 6. My invention is equally well adaptable to a fan ring 90 designed to draw the ventilating air out of the machine with discharge of the air to the outside of the machine.

It is now readily apparent that I have provided a two-bearing construction for dynamoelectric machines requiring no more additional axial space than a single-bearing machine. An excess grease chamber or sump 76 has been located so as not to require extra axial space dimensions and the sump 76 has been made sufficiently large to avoid the need of a grease drain to the outside of the machine. The flow of fresh lubricant entering the bearing housing 36 is directed to the anti-friction elements 56 of the bearing through the outer open face 64 of the bearing. Sufficient extra grease space has been provided to avoid the need for frequent regreasings. Provisions for grease overflow to relieve the pressure tending to force lubricant through the tight running seals of the housing have also been provided. All provisions have been made with no more additional axial space than is required for a single-bearing machine.

Ventilating air propelling means has also been provided in the unused radial area around the coupling thereby allowing an increased rating of the traction drive equipment.

While this invention has been described with a certain degree of particularity, it is to be understood that all equivalents, modifications and alterations within the spirit and scope of my invention are hereby meant to be included.

I claim as my invention:

1. A bearing assembly including a shaft and an end bracket, said shaft passing through the end bracket, a coupling-half secured to said shaft, a bearing cap secured to the outer portion of the end bracket, a bearing housing formed by the end bracket, coupling-half and bearing cap, means for effectively sealing said bearing housing against lubricant leakage, a bearing member within said housing rotatably supporting said shaft, said bearing member having an open face, a lubricant inlet opening in said housing, means adjacent said open face for directing lubricant from said inlet opening towards said face and between said face and said housing, said housing having an overflow sump displaced radially outward from said coupling member between said face and said bearing cap, overflow ports connecting said open bearing face to said overflow sump, said means adjacent said face effective to prevent lubricant from moving directly from said inlet opening to said sump.

2. A dynamoelectric machine comprising a rotor member rotatably supported by a bearing member positioned within a bearing housing, a bearing cap closing said housing on one side of said bearing, said bearing member having an open outer face, the housing and cap spaced away from said face, a reservoir chamber formed within said bearing cap and aligned axially with said face, means for sealing said bearing housing against grease leakage, a grease inlet slot disposed beneath said chamber and communicating with a portion of said bearing face, a grease inlet bore extending radially through said housing and communicating with said grease inlet slot, means adjacent said open face between said face and the housing for directing grease toward said face, a substantially ring-shaped overflow sump within said housing displaced radially outward from said reservoir chamber and disposed between said face and said bearing cap, an overflow port passing through said reservoir chamber from the bearing face to the overflow sump, and said means adjacent said open face effective to prevent grease from moving directly from said grease inlet slot to said overflow sump.

3. A dynamoelectric machine comprising an end bracket with an internal seat and a rotatable member having a shaft, a coupling member on said shaft, a bearing cap secured to the outer portion of the end bracket and forming a running labyrinth seal with the coupling member, a bearing housing effectively sealed against lubricant leakage formed by the end bracket, coupling member, and bearing cap, a bearing member within said housing positioned by said seat and rotatably supporting said shaft, said bearing member having an open outer face, said housing spaced away from said face, a substantially annular first channel formed within said housing and displaced radially from the coupling member forming an excess lubricant sump, an axially extending slot forming a lubricant reservoir formed within said housing and located radially inward from the coupling member, said slot terminating at the outer face of said bearing member on one end of the slot, an inlet bore extending radially through said end bracket and communicating with the opposite end of said slot, a substantially annular second channel formed within said housing radially inward of said coupling member, said second channel spaced away from said bearing face but axially opposite therefrom, and at least one passageway through said second channel connecting said bearing face with said first channel.

4. A bearing assembly including an end bracket, a shaft extending through said end bracket, a coupling half secured to said shaft, said end bracket being substantially concave shaped, a bearing seat disposed centrally of said end bracket, a shaft bearing received in said bearing seat, a bearing cap disposed within the concavity of said end bracket, said bearing cap having an annular stepped configuration on its outer side remote from said bearing, said coupling half having corresponding annular steps mating with said outer side of said end cap, said mating portions forming a running labyrinth seal.

5. A bearing assembly including an end bracket, a shaft extending through said end bracket, a coupling half secured to said shaft, said end bracket being substantially concave shaped, a bearing seat disposed centrally of said end bracket, a shaft bearing received in said bearing seat, a bearing cap disposed within the concavity of said end bracket, said bearing cap having an annular stepped configuration on its outer side remote from said bearing, said coupling half having corresponding annular steps mating with said outer side of said end cap, said mating portions forming a running labyrinth seal, said bearing seat having an annular axially extending groove on its side remote from said bearing, said shaft having an axially extending annular flange received in said groove, said groove and said flange forming a running labyrinth seal.

6. A bearing assembly including an end bracket, a shaft extending through said end bracket, a coupling half secured to said shaft, said end bracket being substantially concave shaped, a bearing seat disposed centrally of said end bracket, a shaft bearing received in said bearing seat, a bearing cap disposed within the concavity of said end bracket, said bearing cap having an annular stepped configuration on its outer side remote from said housing, said coupling half having corresponding annular steps mating with said outer side of said end cap, said mating portions forming a running labyrinth seal, means communicaitng with a face of said bearing for receiving lubricant, means for directing lubricant from said inlet means toward said bearing, an annular excess grease sump formed by said end bracket and said end cap and a grease outlet passage communicating with said bearing and said sump.

7. A bearing assembly including an end bracket, a shaft extending through said end bracket, a coupling half secured to said shaft, said end bracket being substantially concave shaped, a bearing seat disposed centrally of said end bracket, a shaft bearing received in said bearing seat, a bearing cap disposed within the concavity of said end bracket, said bearing cap having an annular stepped configuration on its outer side remote from said bearing, said coupling half having corresponding annular steps mating with said outer side of said end cap, said mating portions forming a running labyrinth seal, said bearing seat having an annular axially extending groove on its side remote from said bearing, said shaft having an axially extending annular flange received in said groove, said groove and said flange forming a running labyrinth seal, means communicating with a face of said bearing for receiving lubricant, means for directing lubricant from said inlet means toward said bearing, an annular excess grease sump formed by said end bracket and said end cap and a grease outlet passage communicating with said bearing and said sump.

References Cited in the file of this patent

UNITED STATES PATENTS

| | | |
|---|---|---|
| 2,403,389 | Morey | July 2, 1946 |
| 2,697,179 | Wendel | Dec. 14, 1954 |
| 2,744,395 | Massey et al. | May 8, 1956 |
| 2,836,471 | Luenberger | May 27, 1958 |